(12) United States Patent
Cha et al.

(10) Patent No.: US 9,441,849 B2
(45) Date of Patent: Sep. 13, 2016

(54) AIR CONDITIONING SYSTEM AND CONTROLLING METHOD THEREOF

(75) Inventors: Byoung Keun Cha, Seoul (KR); Duck Gu Jeon, Seoul (KR); Jae Sik Jung, Seoul (KR); Jong Hyun Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 852 days.

(21) Appl. No.: 13/583,263

(22) PCT Filed: Mar. 4, 2011

(86) PCT No.: PCT/KR2011/001521
§ 371 (c)(1),
(2), (4) Date: Oct. 2, 2012

(87) PCT Pub. No.: WO2011/111956
PCT Pub. Date: Sep. 15, 2011

(65) Prior Publication Data
US 2013/0060386 A1    Mar. 7, 2013

(30) Foreign Application Priority Data
Mar. 8, 2010  (KR) .................... 10-2010-0020334

(51) Int. Cl.
*F24F 11/00*  (2006.01)
*H04Q 9/02*  (2006.01)

(52) U.S. Cl.
CPC ............ *F24F 11/0086* (2013.01); *H04Q 9/02* (2013.01); *F24F 2011/0067* (2013.01); *F24F 2011/0091* (2013.01)

(58) Field of Classification Search
CPC .......... G05B 2219/2614; G05B 15/00; G06F 11/3003; G05D 23/1931; G05D 23/1932; G05D 23/00; G05D 23/1928; G05D 23/1951; G05D 23/1905; F24F 11/0012; F24F 11/006; F24F 11/0086; F24F 2011/0064; F24F 2011/0067; F24F 2011/0068; F24F 2011/0071; F24F 2011/0091; F24F 11/001; G06Q 10/20; H04Q 9/00; H04Q 9/02; H04Q 2209/10; H04L 12/2816; H04L 12/2834; H04L 2012/285; H04L 43/0817; H04L 67/125; F25B 2500/26
USPC ........................................................ 700/278
See application file for complete search history.

(56) References Cited

U.S. PATENT DOCUMENTS 5,435,147 A * 7/1995 Mochizuki ........... F24F 11/0086
                                                       165/209
6,145,328 A * 11/2000 Choi .............................. 62/127

(Continued)

FOREIGN PATENT DOCUMENTS

EP    1 956 311    8/2008
EP    2 012 288    1/2009

(Continued)

OTHER PUBLICATIONS

International Search Report issued in PCT Application No. PCT/KR2011/001521 dated Jun. 15, 2012.

*Primary Examiner* — Crystal J Barnes-Bullock
(74) *Attorney, Agent, or Firm* — Ked & Associates, LLP

(57) ABSTRACT

An air conditioning system and a controlling method of the same are provided. A controlling method of an air conditioning system includes an information collecting step configured to collect the state information or the operation information of the outdoor unit or the indoor unit in a preset period by using the gateway, an information transferring step configured to selectively transfer the information collected in the information collecting step to the data collecting server in a preset period, an information storing step configured to transfer the operation information or the state information of the outdoor unit or the indoor unit out of the information transferred in the information transferring step to the data storage server and to store the transferred information in a preset period; and an information outputting step configured to output the state information or the operation information of the outdoor unit or the indoor unit transferred in the information transferring step to the output unit at predetermined intervals shorter than the preset period using the data collection server, when there is information transfer requirement.

19 Claims, 4 Drawing Sheets

(56) References Cited

U.S. PATENT DOCUMENTS

| | | | | |
|---|---|---|---|---|
| 6,647,317 B2* | 11/2003 | Takai | | F24F 11/0086 700/276 |
| 6,978,627 B2* | 12/2005 | Masui | | F24F 11/006 236/51 |
| 7,043,339 B2* | 5/2006 | Maeda | | F24F 11/0086 700/276 |
| 7,542,824 B2* | 6/2009 | Miki | | F24F 11/0086 236/94 |
| 8,087,257 B2* | 1/2012 | Kim | | F24F 11/0086 62/127 |
| 8,301,763 B2* | 10/2012 | Kawai | | F24F 11/0086 709/223 |
| 8,302,414 B2* | 11/2012 | Hisaoka | | F24F 11/0086 62/190 |
| 9,031,703 B2* | 5/2015 | Nakamura | | G05B 13/026 165/208 |
| 2001/0048376 A1* | 12/2001 | Maeda et al. | | 340/870.17 |
| 2003/0030429 A1* | 2/2003 | Kou | | 324/158.1 |
| 2004/0221170 A1* | 11/2004 | Colvin | | 713/193 |
| 2004/0255601 A1* | 12/2004 | Kwon et al. | | 62/157 |
| 2006/0117767 A1* | 6/2006 | Mowris | | 62/149 |
| 2008/0159213 A1* | 7/2008 | Shorty | | H04L 12/2816 370/329 |
| 2008/0186160 A1* | 8/2008 | Kim et al. | | 340/501 |
| 2008/0195254 A1* | 8/2008 | Jung et al. | | 700/276 |
| 2009/0281677 A1* | 11/2009 | Botich et al. | | 700/295 |
| 2010/0250453 A1* | 9/2010 | Kawai | | G06Q 10/20 705/305 |

FOREIGN PATENT DOCUMENTS

| | | | |
|---|---|---|---|
| JP | 2002-281570 | | 9/2002 |
| JP | 2004-226062 | A | 8/2004 |
| JP | 2004-341776 | | 12/2004 |
| JP | 2007205614 | A * | 8/2007 |
| WO | WO 2009/118877 | A1 | 10/2009 |

* cited by examiner (a)

(b)

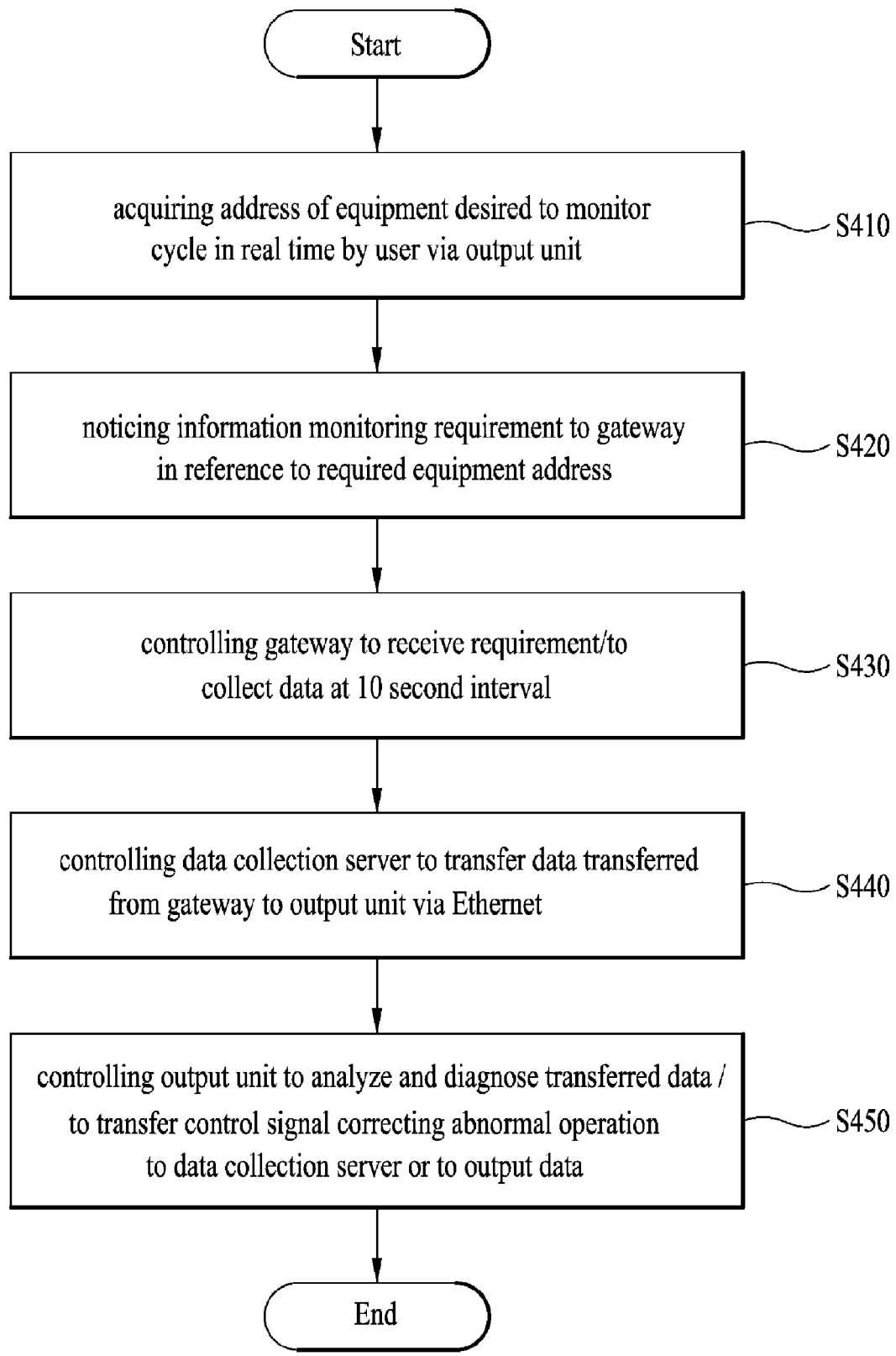

AIR CONDITIONING SYSTEM AND CONTROLLING METHOD THEREOF

CROSS-REFERENCE TO RELATED PATENT APPLICATIONS

This application is a U.S. National Stage Application under 35 U.S.C. §371 of PCT Application No. PCT/KR2011/001521, filed Mar. 4, 2011, which claims priority to Korean Patent Application No. 10-2010-0020334, filed Mar. 8, 2010.

TECHNICAL FIELD

The present invention relates to an air conditioning system and a controlling method thereof, particularly to an air conditioning system including at least one outdoor unit and at least one indoor unit connected with the at least one outdoor unit, which can provide a data collecting gateway and a data collecting server to allow a user to monitor state information or operation information on the at least one outdoor unit or the at least one indoor unit connected with the outdoor unit in real time, and a controlling method thereof.

BACKGROUND ART

Generally, air conditioners are electric appliances which can cool or heat and air-conditions a room to create a pleasant indoor environment for users. Such an air conditioner may be classified into a split type and a wall type. The split type and the wall type have the same function but the split type air conditioner is configured of an indoor unit and an outdoor unit to perform the function of the wall type air conditioner. Here, a plurality of split type air conditioners may be connected with each other and the split type air conditioner has a high industrial applicability.

As usage of the air conditioners has been increasing recently, the indoor unit may be provided in every room of a household or every office of a building. Because of that, there have been installed multi-air conditioners configured of indoor units provided in rooms and outdoor units connected with the indoor units.

An air conditioning system including such a multi-air conditioner includes a multi-air conditioner basically having at least one indoor unit and at least one outdoor unit sharingly connected with the at least one indoor unit and a controller established in a building where the multi-air conditioner is installed, with being connected with each at least one outdoor unit, to monitor states of the indoor and outdoor units and to control the operations of the indoor and outdoor units integratedly or independently.

The outdoor unit figures out state information, operation information or setting information of the outdoor and indoor units and it transfers the information to the controller. When a cooling command is input to a single indoor unit directly, the controller may recognize state and setting information of a corresponding indoor unit connected with a corresponding outdoor unit and it may transmit a control command configured to control a condensation level of refrigerant based on the state and setting information to the corresponding outdoor unit.

The air conditioning system may include a local controller configured to identify an operational state of each multi-air conditioner and to control each multi-air conditioner based on the result of the identification via a gateway.

The local controller may be a common personal computer (PC) or an auxiliary exclusive controller. The gateway is provided to collect and re-transfer information between the common PC or exclusive controller and the plurality of the multi-air conditioners.

According to a conventional air conditioning system, a gateway equipment collects state information data of indoor units (indoor unit names, a set temperature, a room temperature, whether an indoor unit is put into operation and a mode) per every hour on the site and the collected data is transferred to a data collection server located in a remote region simultaneously.

All of the gateway equipment on the site installed in nationwide asynchronously performs the transferring in time for each separate operation time. The data collection server analyzes the received data and it stores the analyzed data in a database. A user of the air conditioner links to a website via an internet anywhere through the country and he or she can identify the state information of the field indoor unit.

DISCLOSURE OF INVENTION

Technical Problem

Under the conventional air conditioning system, a method for monitoring the air conditioning system in a remote area has the following disadvantages.

First of all, it is impossible to perform real-time monitoring for the air conditioning system. To monitor changes of internal data of the air conditioning system meaningfully, there has to be provided a period from at least 10 seconds up to 2 seconds. However, the conventional air conditioning system has a single data transferring period of one hour.

Second, it is impossible to monitor every cycle data of the equipments under the conventional air conditioning system. In other words, the conventional air conditioning system transfers only the state information of the indoor units (an indoor unit name, a set temperature, a room temperature, whether the indoor unit is put into operation and a mode). However, the information actually required to monitor the real-time cycle monitoring has to include information of 90 outdoor units and 20 indoor units.

Third, according to the conventional air conditioning system, the monitoring data is stored in the database and the stored data is then extracted and outputted when access to the website. However, it causes load to the database to re-extract and store the data stored in the database at every 10 second period. The load will be increasing proportionally as the monitoring sites are increasing, which results in load to an entire system.

Solution to Problem

To solve the problems, an object of the present invention is to provide an air conditioning system which can provide a gateway collecting state information of outdoor units or indoor units provided therein at a preset period and a data collection server, to allow a user to monitor real-time cycle data, and a controlling method thereof.

The object of the present invention can be achieved by providing a controlling method of an air conditioning system comprising at least one outdoor unit, at least one indoor unit connected with the at least one outdoor unit, a gateway configured to collect state information or operation information of the outdoor unit and the indoor unit, a data collection server to receive the state information or the operation information collected by the gateway, and a data storage server configured to store the information collected in the data collection server, the controlling method comprising an information collecting step configured to collect the state information or the operation information of the outdoor unit or the indoor unit in a preset period by using the gateway, an information transferring step configured to selectively transfer the information collected in the information collecting step to the data collecting server in a preset period, an information storing step configured to transfer the operation information or the state information of the outdoor unit or the indoor unit out of the information transferred in the information transferring step to the data storage server and to store the transferred information in a preset period and an information outputting step configured to output the state information or the operation information of the outdoor unit or the indoor unit transferred in the information transferring step to the output unit at predetemined intervals shorter than the preset period by using the data collection server, when there is information transfer requirement.

And the object of the present invention can be achieved by providing an air conditioning system comprising at least one outdoor unit, at least one indoor unit connected with the at least one outdoor unit, a gateway configured to collect state information or operation information of the outdoor unit or the indoor unit in a preset period, a data collection server configured to receive the information collected via the gateway in a preset period, a data storage server configured to store the state information or the operation information of the outdoor unit or the indoor unit out of the information received from the data collection server in a preset period and an output unit connected with the data collection server and configured to process or display the information provided from the data collection server.

Advantageous Effects of Invention

The present invention has following advantageous effects.

Using the air conditioning system according to the embodiment of the present invention, the real time cycle data monitoring may be enabled. Because of that, the reason of error generated in the air conditioning system may be analyzed and diagnosed precisely and quickly.

Furthermore, the real time cycle data is transferred to the output unit from the data collection server directly. Because of that, load applied to the air conditioning system may be reduced and data transfer delay may be prevented to enhance precision of the data.

BRIEF DESCRIPTION OF DRAWINGS

The accompanying drawings, which are included to provide further understanding of the disclosure are incorporated in and constitute a part of this application, illustrate embodiments of the disclosure and together with the description serve to explain the principle of the disclosure.

In the drawings:

FIG. 4 is a flow chart illustrating a controlling method of the air conditioning system according to an embodiment of the present invention.

BEST MODE FOR CARRYING OUT THE INVENTION

As follows, an exemplary embodiment of the present invention will be described in detail in reference to the accompanying drawings. Reference will now be made in detail to the specific embodiments of the present invention, examples of which are illustrated in the accompanying drawings. Wherever possible, the same reference numbers will be used throughout the drawings to refer to the same or like parts.

Figure 1:
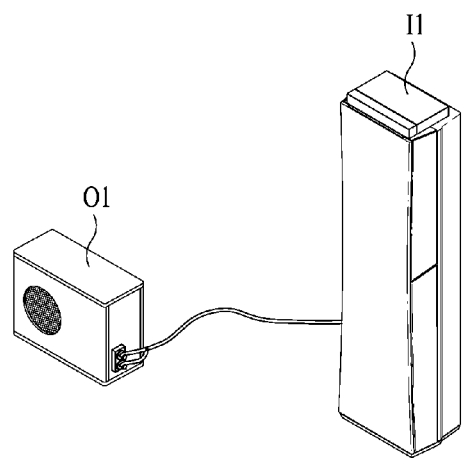
FIG. 1 illustrates an air conditioner according to an embodiment, which composes an air conditioning system according to an exemplary embodiment of the present invention.
Figure 1:
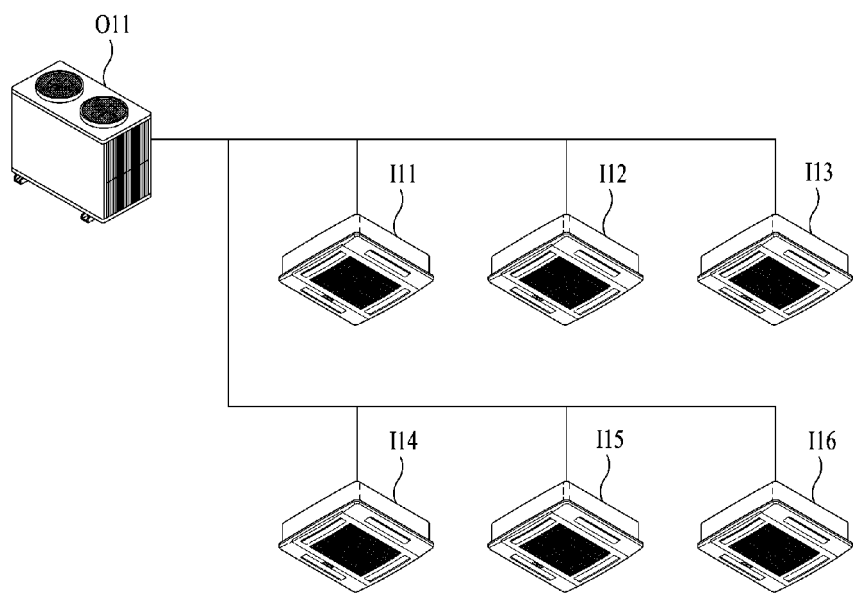

FIG. 1 illustrates an air conditioner according to an embodiment, which composes an air conditioning system according to an exemplary embodiment of the present invention. FIG. 1a is a diagram illustrating a stand-type air conditioner including an indoor unit and an outdoor unit and FIG. 1b is a diagram illustrating a ceiling-type air conditioner including a single outdoor unit and a plurality of indoor units.

Here, the air conditioner according to the embodiment of the present invention is embodied to be the stand-type or ceiling-type shown in the drawings and it may be embodied to be a wall-type and split-type without division of the outdoor and indoor units. The type of the air conditioner according to the embodiment of the present invention may not be limited to the type shown in the drawings.

As shown in FIG. 1a, the air conditioner may include an outdoor unit and at least one indoor unit connected with the outdoor unit. At this time, an indoor unit I1 and an outdoor unit O1 are connected with each other via a refrigerant pipe, to exhaust cool air to a room from the indoor unit according to circulation of refrigerant. The plurality of the indoor units may be connected with the outdoor unit.

As shown in FIG. 1b, the air conditioner may include a plurality of indoor units I11 to I16 and at least one outdoor unit O11 connected with the plurality of the indoor units. The plurality of the indoor units may be connected with the at least one outdoor unit via a communication wire as well as the refrigerant pipe, to transmit and receive a control command based on a preset communication method.

The air conditioner may include a remote controller (not shown) configured to control the plurality of the indoor units and the outdoor unit. The air conditioner may further include a local controller (not shown) connected with the indoor units to input a user command and to output an operational state of the indoor units. Rather than the indoor and outdoor units, the air conditioner may include a ventilation unit, an air cleaning unit, a humidification unit, a dehumidification unit and a heater.

Each of the indoor units (I1 and I11 to I16) may include an indoor heat exchanger (not shown) installed in a room to perform cooling/heating, an indoor ventilator (not shown) having an indoor fan (not shown) installed in a predetermined portion of the indoor heat exchanger to promote heat radiation of refrigerant and an electric motor to rotate the indoor fan, a plurality of sensors (not shown), and control means (not shown) configured to control operation of the indoor units.

The indoor unit (I1 and I11 to I16) includes an air outlet configured to exhaust heat-exchanged air and air direction adjusting means may be provided in the air outlet to close the air outlet and to control a direction of the exhausted air. The indoor unit controls a rotation speed of the indoor fan and it controls the sucked air and the exhausted air to adjust the air direction. In addition, the indoor unit may further include human body sensing means configured to sense a human body located in the room.

At this time, an air inlet and at least one of air outlets including a left air outlet, a right air outlet and an upper air outlet may be opened and closed. Together with that, a vain configured to guide the air is installed and the vain guides a direction of the sucked air and a direction of the exhausted air, rather than closing the air inlet and the air outlets.

The indoor unit (I1 and I11 to I16) may include a display part configured to display operational state information and setting information thereof and an input part configured to allow the user to input setting data. An indoor cabinet may be connected with the local controller via a wire or wirelessly, such that the operation of the indoor unit may be set according to the data input by the local controller and that the operational state may be displayed by the local controller.

The outdoor unit (O1 and O11) is operated in a cooling mode or a heating mode in response to requirement of the indoor unit connected therewith or an external control command, to supply refrigerant to the plurality of the indoor units.

Such the outdoor unit (O1 and O11) may include a compressor configured to compress refrigerant, an electric motor for the compressor configured to drive the compressor, an outdoor heat exchanger configured to heat-radiate the compressed refrigerant, an outdoor ventilator having an outdoor fan installed in the outdoor heat exchanger to promote the heat radiation of the refrigerant and an electric motor configured to rotate the outdoor fan, an expansion device configured to expand the condensed refrigerant, a cooling/heating switch valve configured to switch a path of the compressed refrigerant, and an accumulator configured to supply refrigerant having a preset pressure to the compressor after eliminating moisture and foreign substances from gaseous refrigerant stored therein temporarily. Rather than them, the outdoor unit may further include a plurality of sensors, a valve and an overcooling device and description of them will be omitted.

The outdoor unit (O1 and O11) may be driven by requirement of at least one of the connected indoor units or the control command of the remote controller. As the cooling/heating amount is variable in response to the driving indoor unit, the number of the operating outdoor units and the number of the operating compressors installed in the outdoor units is variable.

Figure 2:
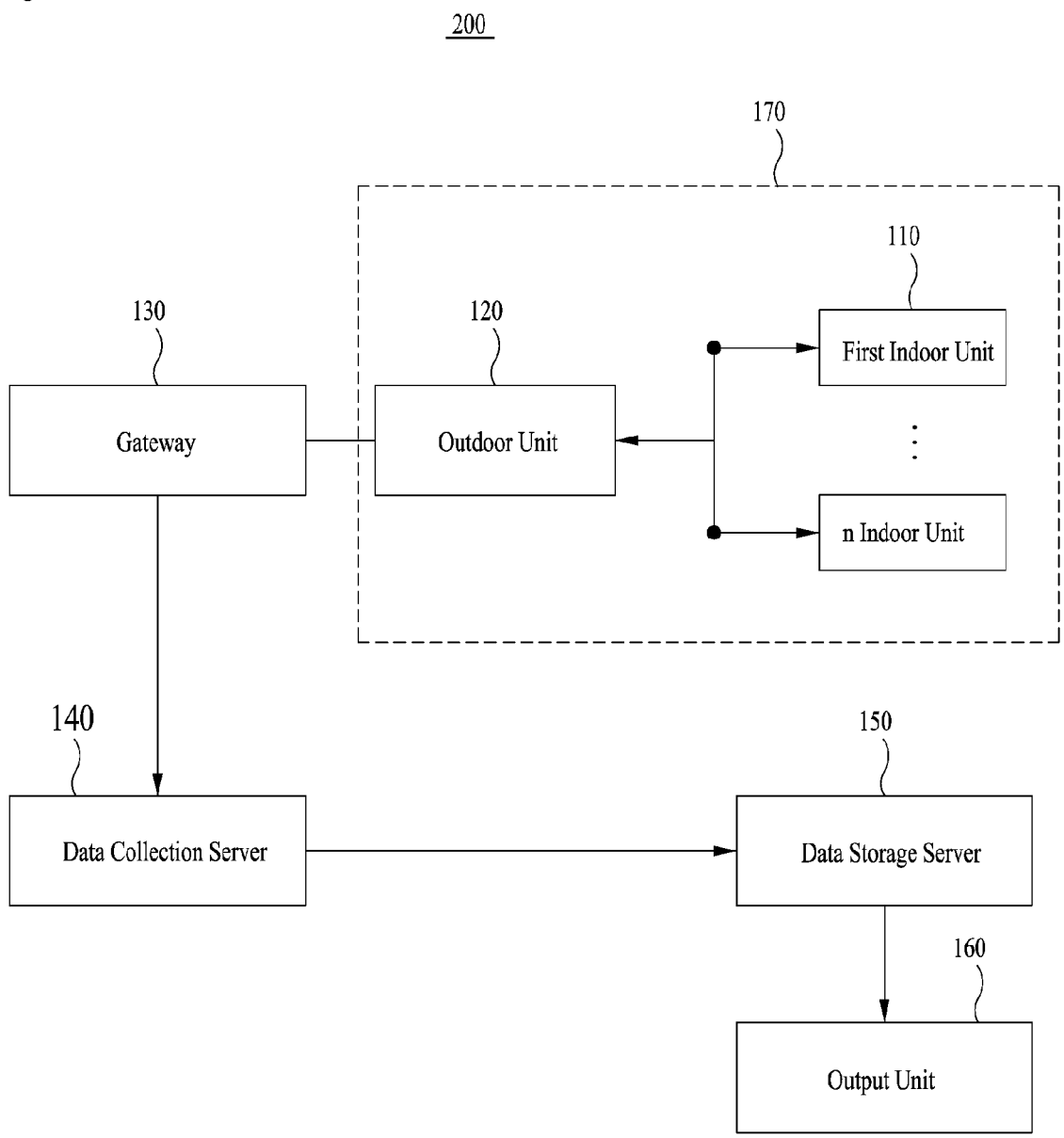
FIG. 2 is a block view illustrating a configuration of the air conditioning system according to the embodiment of the present invention.

FIG. 2 is a block view illustrating a configuration of the air conditioning system according to an embodiment of the present invention.

As shown in FIG. 2, the air conditioning system 200 according to the embodiment of the present invention includes an air conditioner 170 having at least one outdoor unit 120 and at least one indoor unit 110 connected with the at least one outdoor unit 120, a gateway 130 configured to collect state information or operation information of the outdoor unit 120 or the indoor unit 110 and to transfer the collected information to a data collection server 140, a data collection server 140 configured to analyze the transferred data and to transfer a data storage server 150, a data storage server 150 configured to store the transferred data in a database, and an output unit 160 configured to extract and output the storage data.

Figure 3:
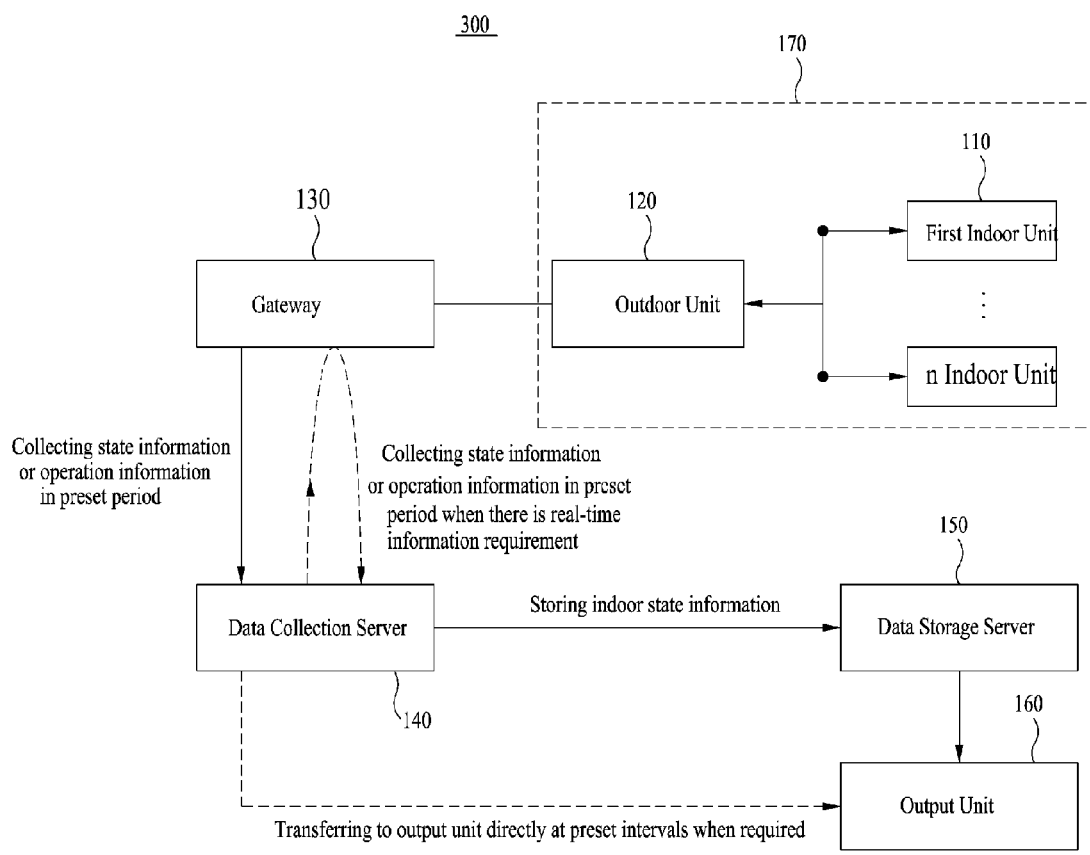
FIG. 3 is a block view illustrating a controlling method of the air conditioning system according to an embodiment of the present invention.

FIG. 3 is a block view illustrating a controlling method of an air conditioning system according to an embodiment of the present invention.

A controlling method of an air conditioning system including at least one outdoor unit, at least one indoor unit connected with the outdoor unit, a gateway collecting state information or operation information of the outdoor and indoor units, a data collection server collecting the information transferred from the gateway and a data storage server storing the information collected in the data collection server may include an information collecting step to collect the state information or the operation information of the outdoor unit or the indoor unit in a preset period, an information transferring step to selectively transfer the information collected in the information collecting step to the data collection server in a preset period, an information storing step to store the transferred information in the data storage server in a preset period after transferring the state information or operation information of the outdoor or indoor unit out of the information transferred in the information transferring step to the data storage server, and an information outputting step to output the state information or operation information of the outdoor or indoor unit transmitted in the information transferring step to the output part at predetemined intervals, which are shorter than the preset period, by using the data collection server, when there is requirement of the information transfer.

The air conditioner is mainly configured of an outdoor unit 120 and an indoor unit 110, and it is operated by the flow of refrigerant between the outdoor unit 120 and the indoor unit 110. For that, a compressor (not shown) provided in the outdoor unit compresses the refrigerant and the compressed refrigerant is supplied to the indoor unit 110. While it is circulating, the phase of the refrigerant is changed through the compressor (heat exchanger), an expansion, an evaporator and this process is referenced to as 'cycle'.

If the air conditioner equipment has some error, flow of cycle data according to the time change has to be analyzed to analyze and diagnose the reason of the error. At this time, data prior to an error generation point is important and cycle data at the error generation point is also important.

The real-time monitoring of the cycle data is important to reduce the analysis time, because the cycle data presenting an abnormal state after the error is generated can be outputted repeatedly and because presentation of the abnormal state plays an important role in analysis and management of the error.

Data having a short period is required to see variation of the compressor rotated at a high speed, change of the refrigerant and change of the cycle generated by the variation of the compressor. That is, data having a short period of at least 10 seconds up to 2 seconds is required to monitor the internal data of the air conditioning system meaningfully.

However, according to the related art, the gateway may collect only the state information of the indoor unit one per an hour to store it in the data storage server to output. Because of that, it is important to monitor the outdoor and indoor units in real time. For example, the data collected hourly can make impossible precise analysis and diagnosis for the reason of the error generated in the air conditioner and it can make the analysis time relatively long.

Different from the air conditioning system 300 according to the present invention, data related to the outdoor unit 120 composing the air conditioning system according to the related art is not monitored and only the state information of the indoor unit 110 is collected and monitored according to the air conditioning system according to the related art.

Furthermore, different from the air conditioning system 300 according to the present invention, the indoor unit state information collected by the gateway 130 is stored in the data storage server 150 (for example, storage performed at a period of 10 seconds) according to the conventional air conditioning system. After that, the data is extracted and outputted when the user requires real-time information identification. Because of that, much load to the database is brought and the amount of the data required to be stored in the data storage server is increasing proportionally as the monitoring sites are increasing. As a result, load to the entire system might occur disadvantageously.

The air conditioning system 300 according to the present invention is invented to solve the above disadvantage. For that, the air conditioning system 300 according to the present invention may include the gateway 130, the data collection server 140, the data storage server 150 and the output unit 160.

The air conditioning system 300 collects the state information or operation information of the outdoor unit 120 or the indoor unit 110 in a preset period by using the gateway 130. For example, the gateway 130 may collect the state information of the outdoor unit 120 or the indoor unit 110 one per 10 minutes. When transfer required for the state information or operation information of the outdoor unit or the indoor unit 110 is inputted from the data collection server 140, the gateway 130 may collect the information and it may transfer the information to the data collection server 140. The transfer requirement may be automatically generated at predetermined intervals, for example, once per 10 seconds.

In a normal state without the real-time information identification required by the user, the information of the indoor unit or the outdoor unit composing the air conditioner is basically collected, transferred and stored in the preset period even without auxiliary requirement. When the real-time information identification is required by the user, auxiliary information transfer requirement may be generated at predetermined intervals and the information may be collected and transferred at predetermined intervals.

That is, in case they user requires the real-time information identification, the transfer requirement is automatically generated at predetermined intervals and the collection, transfer and output of the information is performed also at predetermined intervals.

The information transfer requirement is generated in case the real-time information identification is required by the user. Here, the user may desire to monitor the state information or the operation information of the air conditioner in real time.

Because of that, when the user's requirement is inputted, the gateway 130 collects the information at predetermined intervals shorter than the preset period and the output unit 160 outputs the information stored in the data collection server 140.

When the real-time information identification is required by the user, the output unit 160 outputs the information at the predetermined intervals which may be shorter than the preset period. The preset period which is the period of the information collection and transfer performed by the data collection server may be getting shorter at predetermined intervals.

When there is no user's requirement, the information outputting step may not be performed. In case of no user's requirement, the operation information or state information of the outdoor unit or the indoor unit may be transferred to the data storage server out of the information transferred in the information transferring step. After that, the data storage server may store the transferred information in a preset period, for example, a period of 10 minutes.

In other words, for example, the information may be collected, transferred and stored in a preset period, for example, a period of 10 minutes, when there is no real-time information identification required by the user.

Here, when there is no real time information requirement inputted by the user, the preset period at which the collecting and transferring of the information is performed is decreasing at the predetermined intervals which may be the intervals of the information outputting. The information may be collected, transferred or outputted in the same interval or period. In the other words, the preset period is getting shorter to be the predetermined interval.

Here, the preset period is within 5 minutes to 15 minutes, for example, a period of 10 minutes. The predetermined interval may be within 30 seconds, for example, 10 seconds.

When there is user's information requirement, the information may be outputted in the predetermined interval and the information outputted in the information outputting step may not be stored in the data storage server in the information storing step. This is because data load has to be prevented from increasing too much.

That is, when there is the user's information requirement, too much load of the system generated by the information outputted in the predetermined interval has to be prevented. For that, when the user monitors the information at the predetermined intervals, the information storage step is not performed and the information the user desires to identify may be collected, transferred and outputted at the predetermined intervals, for example, 10 second intervals.

The state information may include identification code information of the indoor unit and the outdoor unit, setting temperature information of the indoor unit, room temperature information, operation identifying information and mode information. The operation information may include error information of the indoor unit and the outdoor unit, error generation information and check-up timing information.

The output unit 160 receives the state information of the indoor unit stored in the data storage server 150 or the state information or operation information of the outdoor unit or the indoor unit transferred from the data collection server 140 according to the information requirement. After that, the output part 160 analyzes and output the analyzed information. In addition, the output part 160 may diagnose an abnormal operation of the outdoor unit or the indoor unit based on the analyzed information and it may propose correction for the abnormal operation of the outdoor unit or the indoor unit based on the result of the diagnosis or it may transfer a control signal configured to correct the abnormal operation based on the diagnosed information or the preset regulation to the data collection server 140.

The gateway 130 may communicate with the outdoor unit 120 and the indoor unit 110 based on Rs-485 of Serial Communication Protocol and it may collect the state information of the indoor unit once per hour according to the result of the communication. The collected data may be transferred to the data collection server 140 located in a remote place based on Ethernet Protocol. The transferring may be performed asynchronously according to a separate operation time by all of the gateways on the sites installed nationwide.

FIG. 4 is a flow chart illustrating the controlling method of the air conditioning system according to the embodiment of the present invention.

As shown in FIG. 4, an address of a piece of equipment of which a cycle is desired to monitor in real time by a user may be acquired via the output unit 160 (S410). In reference to the required address of the equipment, the user's cycle monitoring requirement is noticed to the gateway 130 (S420).

After that, the gateway 130 receives the requirement and it collects data in a preset period, for example, 10 second period (S430).

Hence, the data collection server 140 transfers the data transferred from the gateway 130 via Ethernet (S440).

The output unit 160 may analyze and diagnose the transferred data to transfer the control signal configured to correct abnormal operation to the data collection server 140 or it may parse the data to output (S450).

Using the air conditioning system according to the embodiment of the present invention, the real time cycle data monitoring may be enabled. Because of that, the reason of error generated in the air conditioning system may be analyzed and diagnosed precisely and quickly.

Furthermore, the real time cycle data is transferred to the output unit from the data collection server directly. Because of that, load applied to the air conditioning system may be reduced and data transfer delay may be prevented to enhance precision of the data.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents According to the present invention, the data collection gateway and the data collection server may be provided. Because of that, the user may monitor the cycle data in real time. When there is the user's information requirement, the data collection server may transfer the state information or the operation information of the outdoor unit or the indoor unit. Because of that, system load may be reduced and the data transfer delay may be prevented. In addition, the transferred state information or operation information of the outdoor or indoor unit may be analyzed. Using the analyzed information, abnormal operation of the outdoor unit or indoor unit may be diagnosed and corrected accordingly.

The invention claimed is:

1. A controlling method of an air conditioning system including at least one outdoor device, at least one indoor device connected with the at least one outdoor device, a gateway to collect state information or operation information of the at least one outdoor device and the at least one indoor device, a data collection server to receive the state information or the operation information collected by the gateway, a data storage server to store the information collected in the data collection server, and an output to analyze and output the information collected, the controlling method comprising:

collecting the state information or the operation information of the at least one outdoor device or the at least one indoor device for a predetermined period using the gateway;

transferring the collected state information or the operation information to the data collecting server for the predetermined period;

transferring the collected state information or the operation information of the at least one outdoor device or the at least one indoor device out of the information transferred to the data storage server and storing the collected state information or the operation information for the predetermined period; and outputting the collected state information or the operation information of the at least one outdoor device or the at least one indoor device from the data collecting server to the output at predetermined intervals having a shorter time duration than the predetermined period using the data collection server, when real-time information identification is required by a user, wherein the information output in the outputting is not stored in the data storage server in the information storing.

2. The controlling method of the air conditioning system as claimed in claim 1, wherein a transfer requirement is automatically generated at predetermined intervals, when the real-time information identification is required by the user.

3. The controlling method of the air conditioning system as claimed in claim 2, wherein the predetermined period is between 5 minutes and 15 minutes and the predetermined interval is within 30 seconds.

4. The controlling method of the air conditioning system as claimed in claim 2, wherein a time duration of the predetermined period of the collecting of the information and the transferring of the information is to be identical to a time duration of the predetermined interval.

5. The controlling method of the air conditioning system as claimed in claim 1, wherein the state information of the at least one outdoor device or the at least one indoor device includes at least one of identification code information of the at least one indoor device or the at least one outdoor device, setting temperature information of the at least one indoor device, room temperature information of an air conditioned room having the at least one indoor device installed therein, operation identification information or operation mode information of the at least one outdoor device or the at least one indoor device.

6. The controlling method of the air conditioning system as claimed in claim 1, wherein the operation information of the at least one outdoor device or the at least one indoor device includes at least one of error information of the at least one indoor device and the at least one outdoor device, error generation information, or check-up visiting time information.

7. The controlling method of the air conditioning system as claimed in claim 1, further including:

analyzing the state information or the operation information of the at least one outdoor device or the at least one indoor device using the output.

8. The controlling method of the air conditioning system as claimed in claim 7, wherein the information analyzed is output by the output together with the state information or the operation information of the at least one outdoor device or the at least one indoor device.

9. The controlling method of the air conditioning system as claimed in claim 7, further including:

diagnosing abnormal operation of the at least one outdoor device or the at least one indoor device based on the information analyzed.

10. The controlling method of the air conditioning system as claimed in claim 9, further including:

proposing correction of the abnormal operation generated in the at least one outdoor device or the at least one indoor device based on the information diagnosed in the diagnosing.

11. The controlling method of the air conditioning system as claimed in claim 9, further including:

transferring a control signal correcting the abnormal operation based on a user input signal or a preset regulation to the data collection server.

12. An air conditioning system comprising:
at least one outdoor device;
at least one indoor device connected with the at least one outdoor device;
a gateway configured to collect state information or operation information of the at least one outdoor device or the at least one indoor device for a predetermined period;
a data collection server configured to receive the information collected via the gateway for the predetermined period;
a data storage server configured to store the state information or the operation information of the at least one outdoor device or the at least one indoor device out of the information received from the data collection server for the predetermined period; and
an output connected with the data collection server and configured to process or display the information provided from the data collection server, wherein the output outputs information at predetermined intervals having a shorter time duration than the predetermined period when real-time information identification is required by a user, and a time duration of the predetermined period which is a period of the information collecting and transferring performed by the gateway and the data collection server is identical to a time duration of the predetermined interval, and wherein the information output by the output is not stored in the data storage server when the real-time information identification is required by the user.

13. The air conditioning system as claimed in claim 12, wherein the gateway collects the state information or the operation information of the at least one outdoor device or the at least one indoor device to transfer the information to the data collection server, when transfer of the state information or the operation information is required by the data collection server.

14. The air conditioning system as claimed in claim 13, wherein a transfer requirement is automatically generated at predetermined intervals, when real-time information identification is required by a user.

15. The air conditioning system as claimed in claim 12, wherein the output analyzes the state information or the operation information of the at least one outdoor device or the at least one indoor device transferred from the data collection server.

16. The air conditioning system as claimed in claim 15, wherein the output diagnoses abnormal operation of the at least one outdoor device or the at least one indoor device based on the analyzed information.

17. The air conditioning system as claimed in claim 16, wherein the output proposes correction of the abnormal operation generated in the at least one outdoor device or the at least one indoor device based on the diagnosed information or the output transfers a control signal correcting the abnormal operation based on the diagnosed information or a predetermined regulation to the data collection server.

18. The air conditioning system as claimed in claim 12, wherein the data collection server is connected with an Ethernet.

19. A controlling method of an air conditioning system including at least one outdoor device, at least one indoor device connected with the at least one outdoor device, a gateway to collect information of the at least one outdoor device or the at least one indoor device, a data collection server to receive the collected information, a data storage server to store the collected information, and an output to output the collected information to a remote user, the controlling method comprising:
collecting the information of the at least one outdoor device or the at least one indoor device for a predetermined period using the gateway;
transferring the collected information to the data collection server for the predetermined period;
transferring the collected information from the data collection server to the data storage server and storing the collected information for the predetermined period; and
outputting the collected information from the data storage server to the output for the predetermined period, wherein the collected information is transferred directly from the data collection server to the output for a predetermined interval upon a requirement from the remote user, wherein the predetermined interval is a shorter time duration than the predetermined period, and wherein the information output in the outputting is not stored in the data storage server in the information storing.

* * * * *